No. 860,155. PATENTED JULY 16, 1907.
H. M. RUSSELL, Jr.
MECHANICAL MOVEMENT.
APPLICATION FILED APR. 12, 1907.
3 SHEETS—SHEET 1.
Fig. I
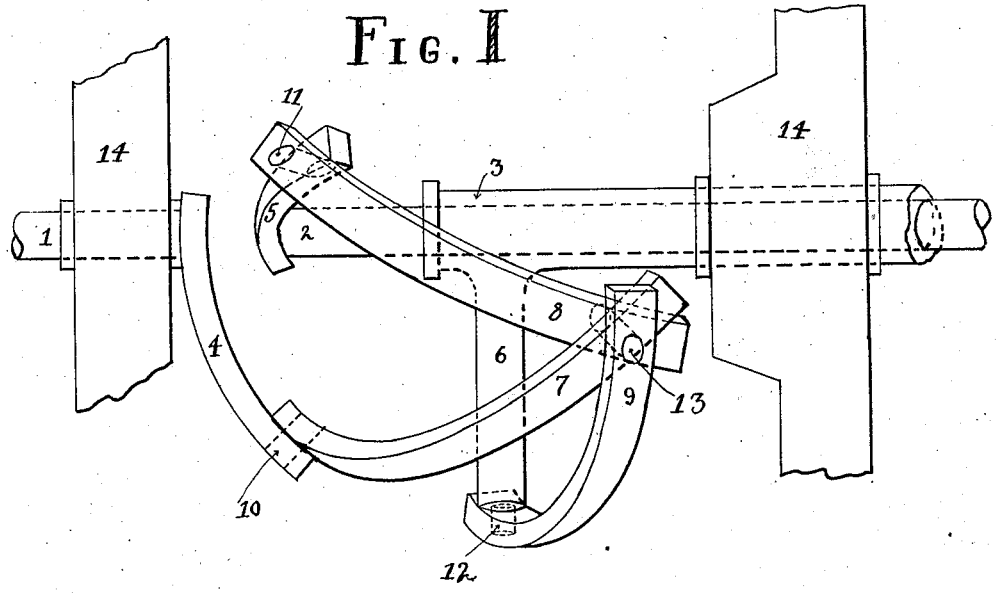
Fig. II
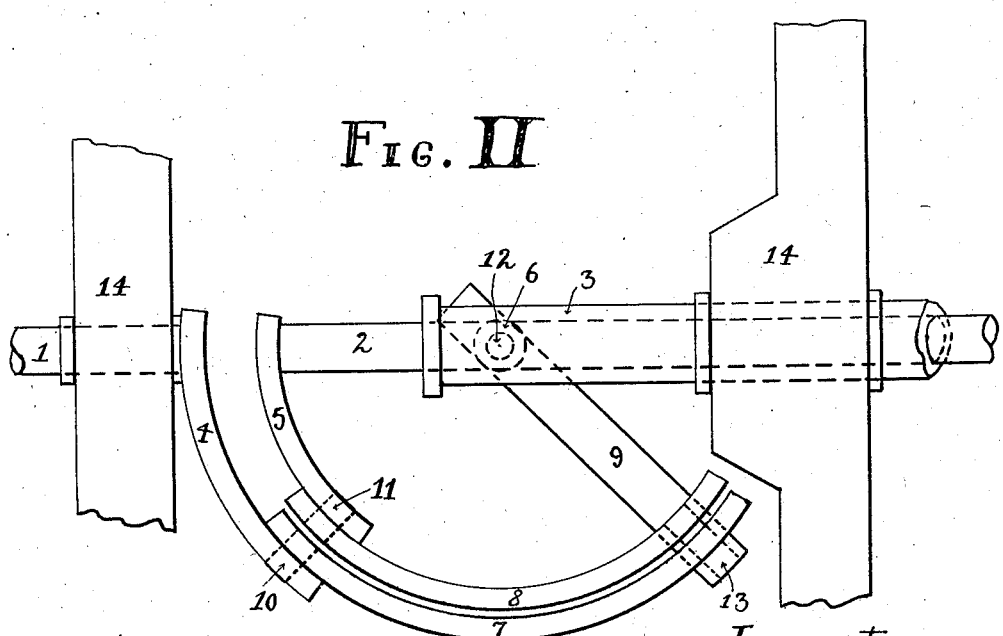
Witnesses
Maria L. Holliday
Henry M. Russell
Inventor

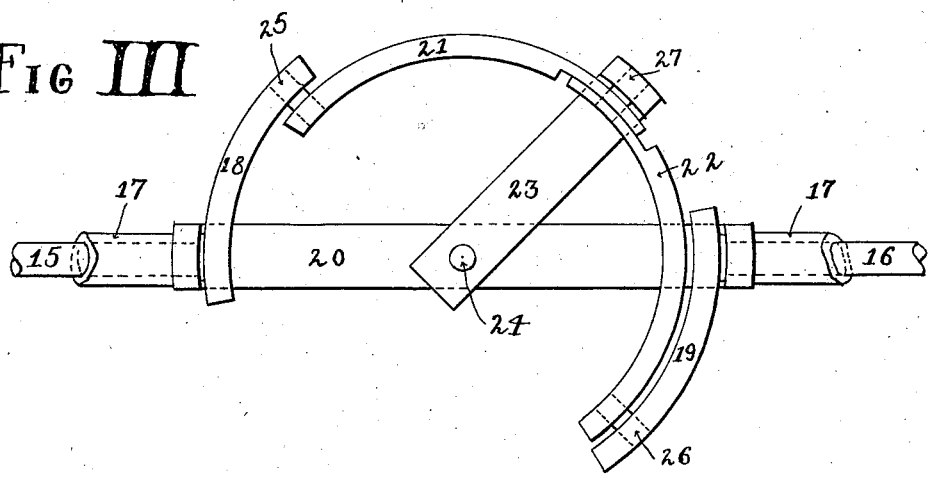
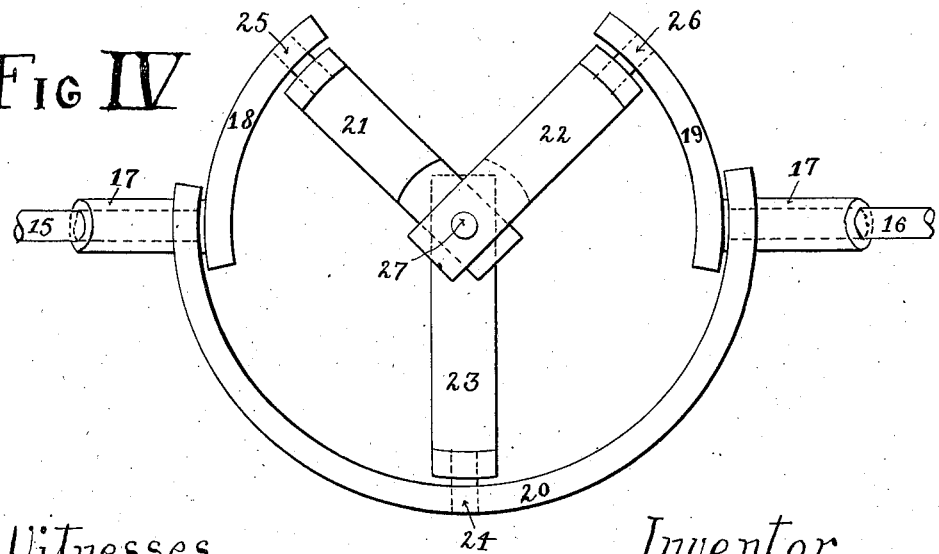

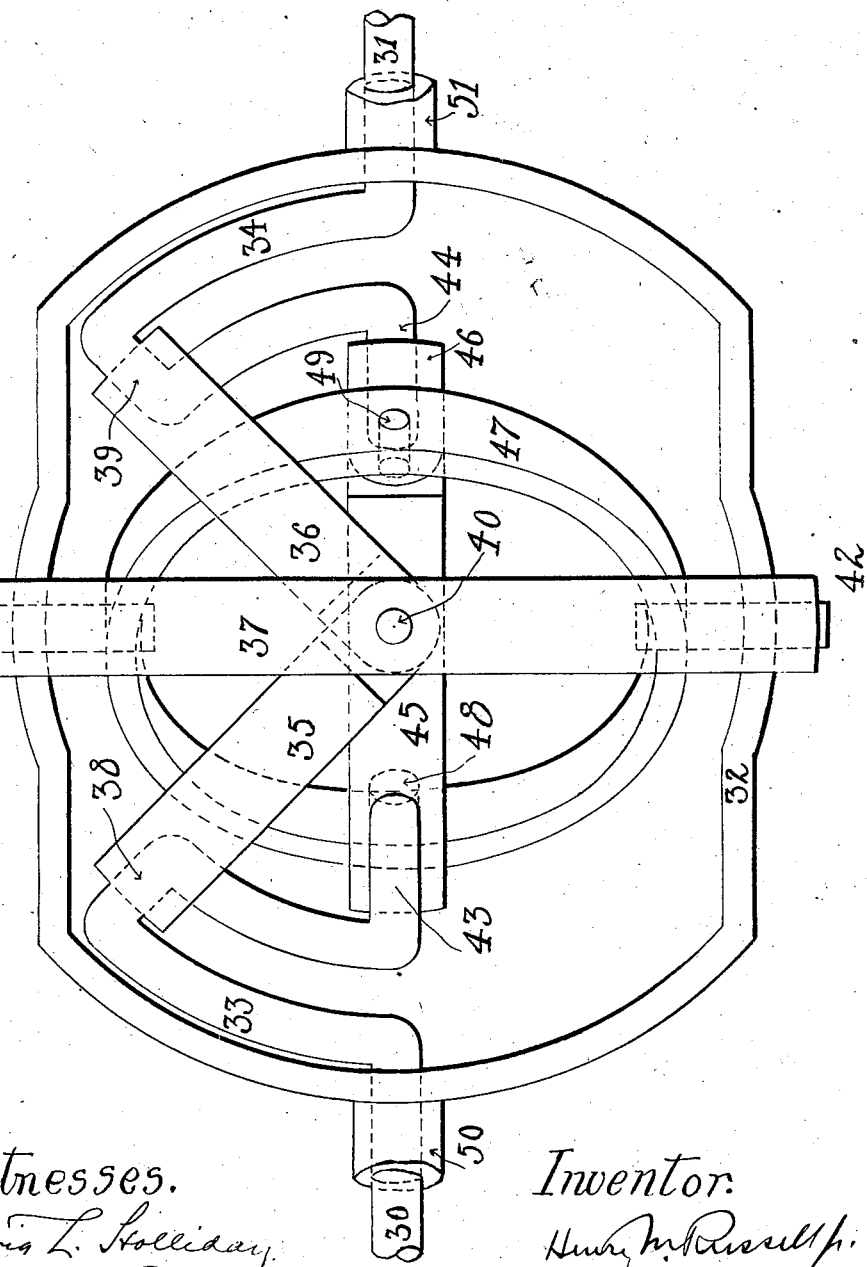

UNITED STATES PATENT OFFICE.

HENRY M. RUSSELL, JR., OF WHEELING, WEST VIRGINIA.

MECHANICAL MOVEMENT.

No. 860,155.  Specification of Letters Patent.  Patented July 16, 1907.

Application filed April 12, 1907. Serial No. 367,835.

*To all whom it may concern:*

Be it known that I, HENRY M. RUSSELL, Jr., of Wheeling, Ohio county, West Virginia, have invented a new and useful Improvement in Mechanical Movements, of which the following is a full, clear, and exact description, reference being had to the accompanying drawings, forming part of this specification, in which—

Figure 1 is an elevation of an elementary form of device embodying my invention; Fig. II is an elevation of the same form with the parts shown in different relative positions; Fig. III is an elevation of a second elementary form of device embodying my invention; Fig. IV is an elevation of this second form with the parts shown in different relative positions; Fig. V is an elevation of a more complex device embodying my invention.

My invention has relation to mechanical movements used for various purposes, and especially employed in the transmission of power from engines or other prime movers to other machinery, and also to mechanical movements used for many of the purposes for which planetary or epicyclic wheel trains are now employed, as for example, in the speed changing apparatus of automobiles.

One object of my invention is to provide a device capable of causing a driven shaft to rotate at a speed different from the speed of the driving shaft without employing gears or friction contacts, which shall be positive in its action and which can be so constructed as to operate with no sliding friction whatever.

Another object of my invention is to provide a substitute for toothed gearing which shall operate with less jar, less noise and less loss of power by friction, and which shall be less liable to injury by reason of its parts getting out of alinement.

My invention consists of three alined shafts connected by conic linkwork in such a manner that they are free to rotate about their common axis so that the angular velocity of one of the three shafts shall be a mean between the angular velocities of the other two shafts but not to rotate otherwise.

My invention also consists in the novel construction arrangement and combination of parts all as hereinafter described and pointed out in the appended claims.

Referring first to the elementary form shown in Figs. I and II the numerals 1, 2 and 3 designate the three alined members which are free to rotate about a common axis, but are prevented from moving otherwise than about this axis by the bearings 14, which are attached to a suitable rigid frame, not shown. The member 3 has the form of a hollow sleeve in which 2 turns freely. The three members are prevented from moving along their axis by suitable collars.

4 and 5 designate curved cranks rigidly attached respectively to the members 1 and 2. Pins 10 and 11 are fixed in the cranks 4 and 5 in such positions that the center lines of pins 10 and 11 produced make equal angles with the common axis of 1, 2 and 3 and intersect this axis at the same point, which point will be hereinafter referred to as the "common center." The angles which the center lines of the pins 10 and 11 make with the axis may have any values so long as they are equal and are less than 90 degrees.

6 is an arm rigidly attached to the member 3 and carrying a pin 12 in such a position that the center line of the pin 12 produced passes through the common center.

7 and 8 are curved links which subtend equal angles about the common center and turn respectively on the pins 10 and 11.

9 is a link which subtends an angle of 90° about the common center and turns on the pin 12.

The free ends of the links 7, 8 and 9 are connected by a pin 13 the center line of which produced also passes through the common center. It is to be understood that the angles subtended by the various links are to be measured between the center lines of the holes made in their ends to receive the pins.

We now have a system of conic linkage made up of six cylindric pairs of elements whose axes are not parallel but intersect at a finite distance. The system will be movable since it fulfils the condition required to be fulfilled in order that a conic linkage may be movable, namely: that all the axes shall pass through a common point. This will be obvious when we consider that every pin and every hole must point toward the common center in every possible position of the links.

The parts 4, 5, 7 and 8 together with the parts 1, 2, 10, 11 and 13 form what is practically a four bar, closed, conic linkage. To form a completely closed linkage the links 4 and 5 should turn about a common pin. I attach these links to separate parts 1 and 2; but since the parts 1 and 2 are always held in alinement the effect is exactly the same as if the links 4 and 5 turned on a common pin. We may therefore without error regard this as a closed linkage. If we now pass planes through the center lines of 4, 5, 7 and 8 and let all of these planes pass through the common center and also pass a plane through the axis of members 1 and 2 and through the center line of the pin 13 and let all these planes intersect any sphere whose center is at the common center we shall have two spherical triangles with the three sides of one equal respectively to the three sides of the other, but oppositely placed. Therefore the plane passed through the axis of 1 and 2 and through the pin 13 will make equal angles with the planes passed respectively through 4 and 5 in every possible position of the parts. Therefore if we hold 4 stationary and drive shaft 2, thereby rotating 5, the plane including 13 will rotate about the axis of 1 and 2 with an angular velocity equal to one-half the angular velocity of 5.

Now consider the members 3, 6 and 9 and the pins 12 and 13 together. Since the link 9 subtends an angle of 90° and turns upon the pin 12, the center line of which passes through the common center of the device, any possible motion of the pin 13 will be made up of rotation about the axis of shafts 1 and 2 and rotation about the center line of pin 12. The former of these two rotations will be communicated to the member 3 but the latter will not. It has been shown above that the plane passing through the axis of the shafts 1 and 2 and through the pin 13 always makes equal angles with the respective planes of 4 and 5. Therefore if we hold 1 stationary and rotate 2 the pin 13 will rotate about the axis of 1 and 2 with an angular velocity equal to half the angular velocity of 2. But we have shown the component of the motion of pin 13 which consists in movement about the axis of 1 and 2 is communicated to the member 3 while the other component of its motion is not. Therefore if we hold 1 stationary and rotate 2, 3 will rotate with an angular velocity equal to half that of 2. It can likewise be shown that if we release 1 and hold 3 stationary and rotate 2, then 1 will rotate with the same angular velocity but in the opposite direction. It can be shown further that if we drive the device by rotating 3, then 1 and 2 will rotate with relative velocities depending upon the resistance which they respectively encounter.

Referring now to the second elementary form shown in Figs. III and IV, 15 and 16 designate shafts which turn freely in the hollow shafts 17. The latter are connected by the semi-circular piece 20, and the device therefore requires no outside support to keep its parts in their proper relative positions.

18 and 19 are cranks which subtend angles of 45° each about the common center. The links 21, 22 and 23 all subtend angles of 90° and are connected to each other by the pin 27 and are connected respectively to the cranks 18 and 19 and to the middle point of the part 20 by pins 25, 26 and 24. All the pins must be so placed that their center lines produced shall pass through the common center of the device. The chief difference between this form and the form first described is that in this form the cranks are placed on opposite sides of the common center. The links 21 and 22 in the second form must subtend angles of 90°. To understand the operation of this second form assume that in the first form shown in Figs. I and II the links 7 and 8 subtend angles of 90°. Then produce the center line of the pin 11 through the common center and continue the link 8 until it becomes a semicircle and meets that line. Then when the device is operated the produced portions of the link 8 and the pin 11 will have exactly the same motions as the link 22 and the pin 26. It is obvious, therefore, that parts 15, 16 and 17 in Figs. III and IV will have the same relative motions as the parts 1, 2 and 3 in Figs. I and II. And this may be shown geometrically by proof similar to the one above given.

It will be seen that in both the forms described there are two positions of the parts in which the device is unable to transmit any power. These may be called dead points. Fig. II shows the first form on a dead point and Fig. III shows the second form on a dead point.

To transmit continuous rotary motion some means must be adopted to prevent the device from stopping on the dead points. This may be done by using a fly-wheel, or by using two separate devices with their shafts connected. But I prefer to use two elementary movements acting about a common axis and having a common center but so placed that their dead points shall not come together. Fig. V shows this arrangement.

Referring now to Fig. V 30, 31 and 32 designate the three revoluble members. 30 and 31 turn freely in the hollow shafts 50 and 51 which are rigidly connected to the member 32. The parts 32, 33, 34, 35, 36, 37 and the connecting pins 38, 39, 40, 41 and 42 form a linkage similar to that shown in Figs. III and IV. The parts are shown in the same position as the parts in Fig. IV. It will be seen that the cranks 33 and 34 are made solid with their respective pins 38 and 39, and also that members 32 and 37 which correspond respectively to parts 20 and 23 Figs. III and IV have been made into complete rings. Members 35 and 36 which correspond to parts 21 and 22, Figs. III and IV are semi-circles and are connected to 37 at both sides. These changes are merely to give greater strength and better balance and do not affect the action. After forming the pins 38 and 39 the cranks continue back to the common axis and then form cranks 43 and 44 in planes at right angles to the planes of 33 and 34. These cranks also subtend angles of 45 degrees about the common center. These cranks 43 and 44 with the parts 45, 46, 47 and 32 and the connecting pins form a second linkage similar to that shown in Figs. III and IV. The parts of the linkage are in the same relative positions as the parts in Fig. III but in V it is shown perpendicular to the plane of the paper instead of in that plane as in III. The links 45 and 46 which correspond to links 21 and 22 in Figs. III and IV. are made semicircles and are connected by pins at either end, though only one of these pins (49) is shown to avoid confusion of lines. Only one of the crank pins (48) is shown in full for the same reason. The members 45 and 46 form a ring hinged about a diameter. The double throw cranks 33, 43 and 34, 44 are identical and therefore since they are opposite it is obvious that when 33 and 34 are on the same side of the axis 43 and 44 must be on opposite sides of the axis. Therefore the dead points of the two linkage cannot come together.

It will be seen that the relative motion of the parts 30, 31 and 32 will be the same as those of parts 1, 2 and 3 in Figs. I and II. Then if we connect 31 to a motor rotating at a uniform speed and connect 32 (or 50 or 51) to a machine to be driven and provide means (which means may be clutches similar to those now in use) for connecting 32 rigidly to 31 and also for preventing the rotation of 30 at ill, we shall have what is known as a "two speed gear". That is, we shall be able at will to drive the machine to be driven either at the same speed as the motor or at half that speed. By further providing means for attaching the machine to be driven either to 32 or 30 and also means for preventing the rotation of 32 we secure "two speeds and a reverse".

It is to be understood that the linkage may be connected in various ways and that various changes may be made in the structural details.

It is also to be understood that since the motion of each member relative to the adjacent members is one of simple rotation about a fixed axis ball or roller bearings may be used at any or all of the joints.

What I claim is:

1. In a mechanical movement the combination of three alined revoluble members and conic linkwork connecting the said revoluble members differentially.

2. In a mechanical movement the combination of three alined revoluble members, three pins rigidly fixed to the said members respectively in such positions that the center lines of all three of the said pins shall intersect the axis of the said alined members at the same point, and that the center line of one of the said pins shall make an angle of ninety degrees with the said axis and the center lines of the other two of the said pins shall make with the said axis equal angles less than ninety degrees, three links turning respectively upon the said pins, the said links having the shape of quadrants of circles, described about the point of intersection of the center lines of the said pins with the said axis as a center, and a fourth pin connecting the free ends of the said three links, the said fourth pin being so placed that its center line produced shall pass through the last mentioned point of intersection substantially as described.

3. In a mechanical movement the combination of three alined revoluble members and two members hinged to each other, pins connecting two of the said alined members respectively to the two hinged members, the said pins being so placed that their center lines produced shall intersect the common axis of the alined members at the same point and shall make equal angles therewith and that the common axis of the said hinged members shall pass through the last mentioned point, and the third of the said alined members being so connected to the said hinged members that it shall rotate about the common axis of the alined members with an angular velocity equal to the angular velocity with which the common axis of the said hinged members rotates about the common axis of the said alined members.

4. In a mechanical movement the combination of a hinge and a revoluble member, one leaf of the hinge being revoluble about a fixed axis, means for rotating the other leaf of the hinge about a movable axis so located that once in each rotation it shall coincide with the said fixed axis and means for transmitting the rotation of the hinge pin to the revoluble member.

5. In a mechanical movement the combination of two alined shafts, equal cranks attached to the said shafts, equal connecting rods turning upon the said cranks and a pin connecting the free ends of the said connecting rods, the said cranks and connecting rods being so shaped as to form a conic linkage, and a revoluble member alined with the said shafts and so connected to the said pin that any motion of the said pin about the axis of the said shafts shall be communicated to the said revoluble member but that any motion of the said pin otherwise than about such axis shall not be communicated to the said revoluble member substantially as described.

6. In a mechanical movement the combination of three two bar conic linkages and three alined shafts one link of each two bar linkage being connected respectively to each of the alined shafts, two of the said links so connected to the shafts being equal and the remaining four links each subtending an angle of ninety degrees and the free ends of three loose links of the three said linkages being connected to each other, all of the said linkages acting about a common point as a center which point lies in the axis of the said alined parts substantially as described.

7. In a mechanical movement the combination of two members and a pin connecting them to form a hinge, one of the said members being revoluble about a fixed axis and the other of said members being revoluble about a movable axis and a third member revoluble about a fixed axis and a universal joint connectiing the said pin to the said third revoluble member.

8. In a mechanical movement four curved bars and four pins forming a symmetrical four bar conic linkage a revoluble member and a universal joint connecting one of the pins lying in the plane of symmetry of the said linkage to the said revoluble member.

9. In a mechanical movement the combination of three alined revoluble members, two systems of conic linkwork, each system being intermediate of the three said alined members and being so constructed as to permit one of the said alined members to rotate at a speed equal to one-half the sum of the speeds of the other two alined members and the said two systems being so placed relatively to each other that they shall never both be on their dead centers at the same time.

10. In a mechanical movement the combination of three alined revoluble members and two sets of conic link-work differentially connecting the said alined members, the said two sets of link-work being so placed that their dead points shall not come together.

11. In a mechanical movement the combination of three alined revoluble members, two separate, symmetrical, four bar, conic linkages intermediate of two of the said revoluble members, and two gimbal points connecting the two idle pins of the said linkages, with the third of the said revoluble members, the linkages being so placed that when the four links of one of the said linkages lie in a plane the four links of the other shall not lie in a plane, substantially as described.

HENRY M. RUSSELL, Jr.

Witnesses:
MARIA L. HOLLIDAY,
HENRY M. RUSSELL.